2 Sheets—Sheet 2.
J. A. SPRAGUE.
MACHINE FOR EXCAVATING AND CONVEYING EARTH.
No. 7,723. Patented Oct. 15, 1850.
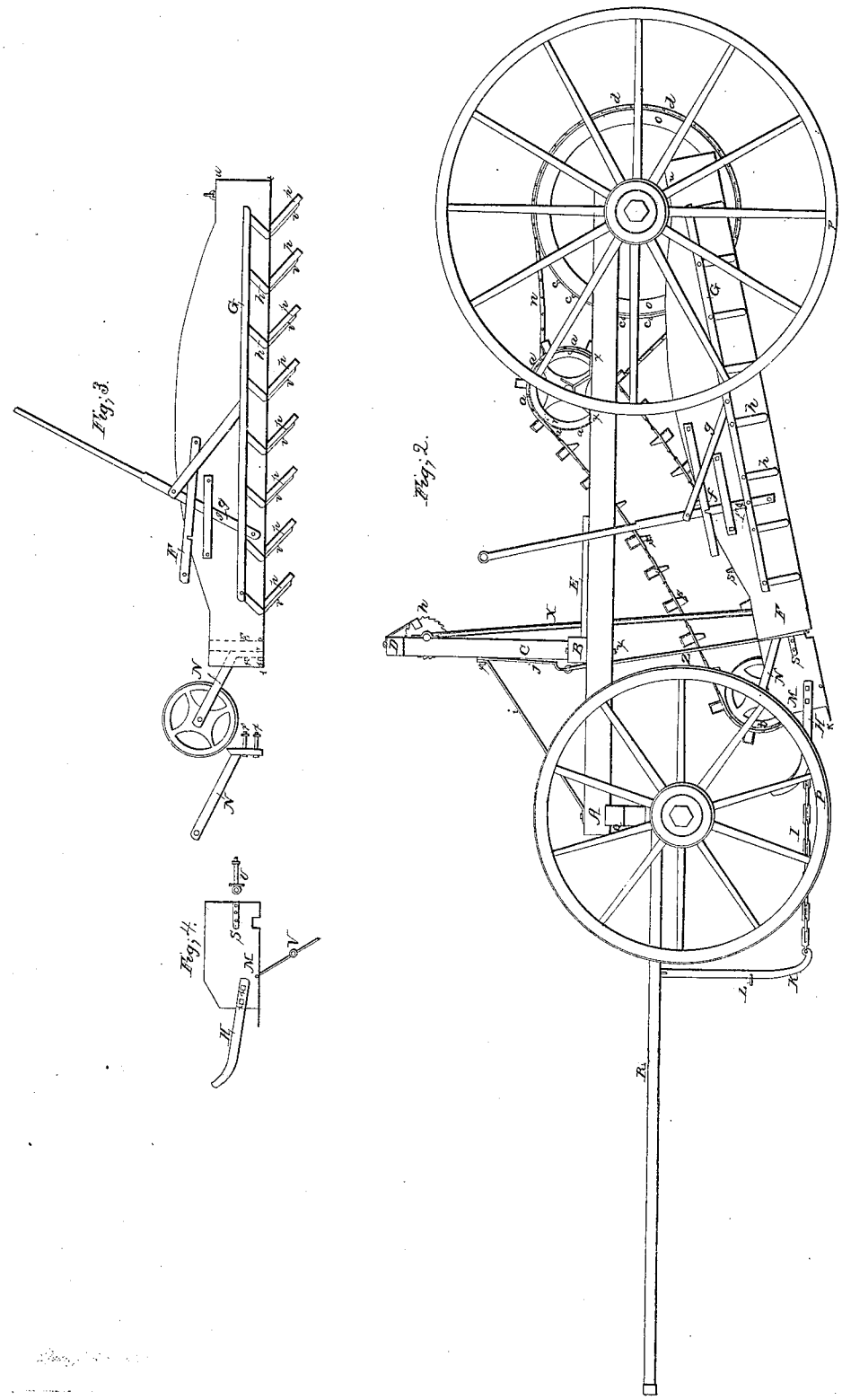

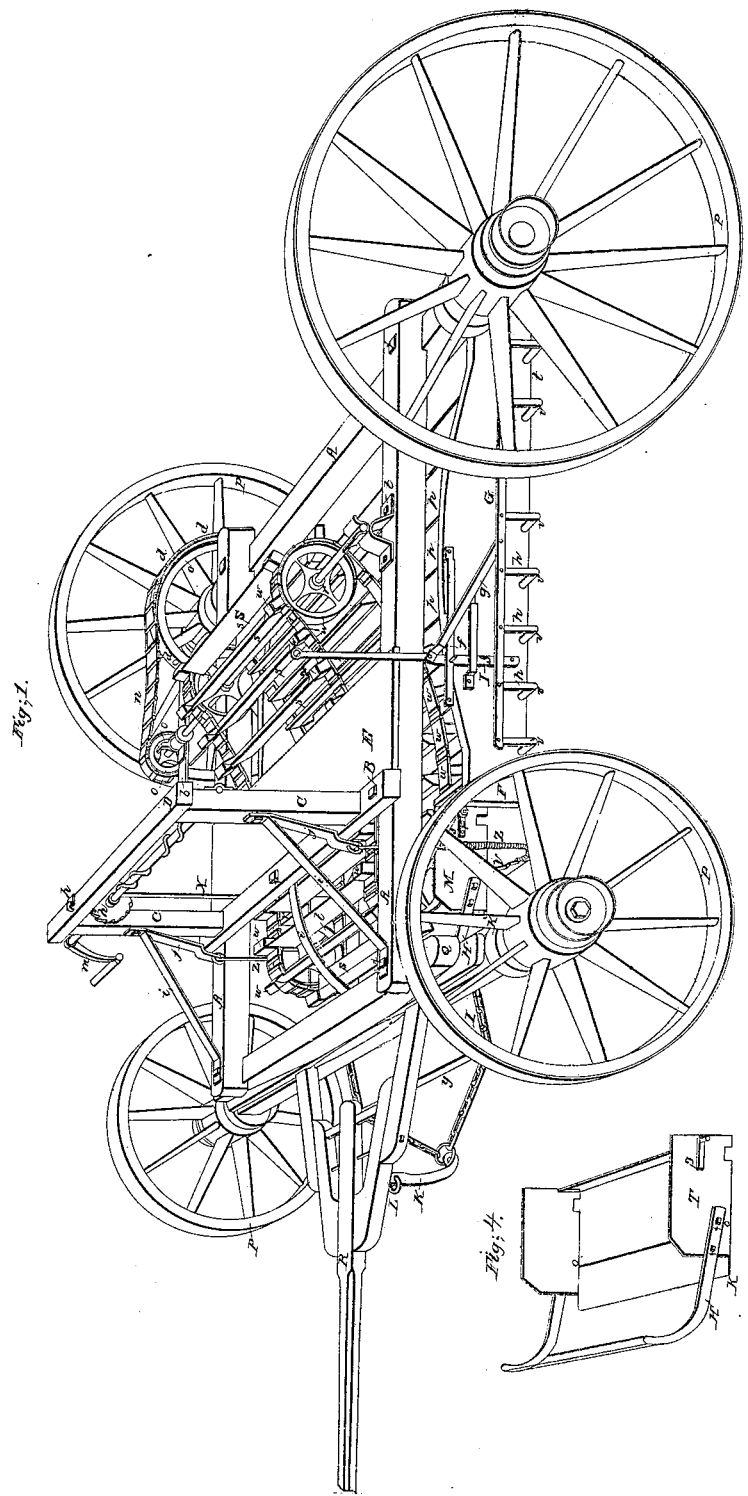

UNITED STATES PATENT OFFICE.

JNO. A. SPRAGUE, OF DAYTON, OHIO.

MACHINE FOR EXCAVATING AND CONVEYING EARTH.

Specification of Letters Patent No. 7,723, dated October 15, 1850.

*To all whom it may concern:*

Be it known that I, JOHN A. SPRAGUE, of the city of Dayton, in the county of Montgomery and State of Ohio, have invented a new and useful machine for excavating and conveying earth in constructing railroads and canals and for like purposes, which I call an "excavator;" and I do hereby declare that the following is a full, clear, and exact description of the construction and operation of the same, reference being had to the annexed drawings, making a part of this specification, in which—

Figure 1 is a perspective view. Fig. 2 is a vertical projection. Fig. 3 is a vertical projection of the earth bed with the bottom slats turned down, and Fig. 4 is a view of the scoop by itself.

The machine consists of the wheels P, axles, tongue R, and forward bolster Q, of a common two horse wagon, the fore and hind axles of which are coupled together by a frame A, upon which, near the fore end is a windlass, consisting of a lower cross timber B and two upright timbers C C, and an upper cross timber D, and an iron shaft and a rag wheel $h$, and a crank $m$. Also upon the frame A, is a platform E, for the driver to stand upon. Under the frame is the earth bed F, suspended to the hind axle permanently by the stirrups $n$, the fore end of which is suspended by the chains X, and can be depressed to the surface of the ground and elevated again to a level position by the operation of the windlass. To the forward end of the earth bed is attached the scoop M, by a hinge joint S U. In and above the scoop there are two pulleys on a shaft attached to the earth bed by the arm N, around which revolve two endless chains $w$, which run upon and are driven by two pulleys $r$, on a shaft placed above the frame A, and near its back end, and which shaft is driven by the endless chain $n$, which runs on the small pulley $o$, and on a large one O attached to the right hind wheel. This may also be done by gearing instead of the endless chain. The small pulley $o$, is loose and is locked and unlocked by the dog and brake $l$, which is operated by the raising and lowering of the fore end of the earth bed, so that when the bed is lowered the elevators are set in motion and when it is raised to a level they do not move. Upon the two endless chains $w$, are fixed a number of hoes or elevators $s$, which convey the earth as it rises into the scoop, back into the earth bed. The bottom of the bed consists of transverse slats P, which are hung by pivots near their forward edge and attached together at one end outside of the bed by the cranks $h$, and the pitman G, which is connected by the brace $g$, to the brake I, which is held in its place by the latch $f$. Under the wagon tongue is suspended perpendicularly an iron whiffletree K, to the lower end of which is attached the straddle chain I from the scoop and to the middle of which is attached by a ring L and clevis the double whiffletree of the team. The bottom of the scoop V, is hung by pivots at each end near the front edge, and the other edge is suspended by the chains Z, so that when the scoop is lowered to the ground the bottom closes itself and when the scoop is raised the bottom falls open and discharges whatever is in it. On the sides of the scoop, and projecting in front of it, are two arms H, across which and about three inches above the cutter of the scoop is a piece of heavy sheet iron which serves the purpose of a regulator, so that the scoop cannot cut into the earth more than about three inches deep.

The manner of operating the machine is as follows: The surface of the ground being plowed, the excavator is driven upon it, when the team is stopped and the driver by means of the windlass lowers the forward end of the earth bed until the edge of scoop comes in contact with the earth, then by driving forward the scoop cuts into the earth, which rises upon it, and is carried back into the bed by the elevators. By driving forward about one hundred feet a load is taken up, then the team is stopped while the driver raises up the bed to a level position, when it is driven away to the place of deposit and without stopping the team, the load is instantly discharged by its own weight tilting the transverse slats of the bottom, whenever the latch is disengaged from the brake.

What I claim, and for which I wish to obtain Letters Patent is—

1. The combination of the series of elevators with the scoop and a rising and falling earth bed furnished with an apparatus for emptying the same, the whole arranged and acting substantially as herein described.

2. I also claim a regulator to the scoop attached in the manner and for the purposes herein specified.

Dayton Ohio September 1850.

JOHN A. SPRAGUE.

Witnesses:
T. M. LEWIS,
S. A. THOMPSON.